US005214263A

United States Patent [19]

Sakuragi

[11] Patent Number: 5,214,263

[45] Date of Patent: May 25, 1993

[54] TRANSFERRED PLASMA ARC TORCH

[75] Inventor: Shun-ichi Sakuragi, Hiratsuka, Japan

[73] Assignee: Kabushiki Kaisha Komatsu Seisakusho, Tokyo, Japan

[21] Appl. No.: 689,279

[22] PCT Filed: Dec. 25, 1989

[86] PCT No.: PCT/JP89/01300

§ 371 Date: Jun. 6, 1991

§ 102(e) Date: Jun. 6, 1991

[87] PCT Pub. No.: WO90/07395

PCT Pub. Date: Jul. 12, 1990

[30] Foreign Application Priority Data

Dec. 26, 1988 [JP] Japan ............................... 63-325962

[51] Int. Cl.⁵ ............................................... B23K 9/00

[52] U.S. Cl. ............................ 219/121.5; 219/121.52; 219/121.48; 219/75

[58] Field of Search ........... 219/121.5, 121.51, 121.52, 219/121.55, 74, 75, 121.48; 313/231.31, 231.41

[56] References Cited

U.S. PATENT DOCUMENTS 4,311,897 1/1982 Yerushalmy .................... 219/121.5

4,954,688 9/1990 Winterfeldt ...................... 219/121.5

FOREIGN PATENT DOCUMENTS 52-52845 4/1977 Japan .

57-50146 11/1982 Japan .

62-240171 10/1987 Japan .

*Primary Examiner*—Mark H. Paschall

*Attorney, Agent, or Firm*—Frost & Jacobs

[57] ABSTRACT

Herein disclosed is a transferred plasma arc torch capable of obtaining an excellent cut face having a small angle of inclination even in the case of cutting a thick plate. In the torch, the tip of an electrode holder (2) holding an electrode (3) fixedly is enclosed by a nozzle (1) forming a tapered working gas passage (4) together with the electrode holder (2). The nozzle (1) has such a chamber (7, 7*a*, 7*b* or 7*c*) inside of a throat (1*a*) formed in the tip of the nozzle (1) as faces the electrode (3). The following relations are satisfied if the throat diameter of the nozzle (1) is designated at d and if the diameter and axial length of the chamber are designated at D and H, respectively: $1.5 \leqq D/d \leqq 10$; and $0.75 \leqq H/D \leqq 5$. A swirler (6) for generating a swirling flow is disposed upstream of the working gas passage (4).

6 Claims, 4 Drawing Sheets

THE PRIOR ART

THE PRIOR ART

TRANSFERRED PLASMA ARC TORCH

TECHNICAL FIELD OF THE INVENTION

The present invention relates to a transferred plasma arc torch and, more particularly, a transferred plasma arc torch capable of obtaining excellent cut face even in the case of cutting a thick plate.

BACKGROUND OF THE INVENTION

One transferred plasma arc torch according to the prior art is shown in FIG. 1. This transferred plasma arc torch of the prior art has its torch a tapered at its portion facing an electrode c which is held by an electrode holder b. The working gases in the torch are guided to pass through a working gas passage e, which is in the shortest gap around the electrode holder b, and are then accelerated in the nozzle a having a gradually reduced effective area, until they reach the throat f of the nozzle a, which has a diameter d and a length l. From this throat f, the gases are discharged to the outside at a velocity equal to their sonic velocity.

In the case of the transferred plasma arc torch of a metal plate using the aforementioned nozzle a of the prior art, the cut face is highly frequently inclined from the start of the cutting even if the nozzle a used is new.

According to our investigations, it has been found that the major causes for the aforementioned phenomena are, as follows:

Due to a minute displacement between the center lines of the electrode c and the nozzle a, the gap between the electrode c and the nozzle a becomes uneven so that the flow velocity of the working gases passing the working gas passage e in that gap becomes asymmetrical with respect to the center line of the nozzle a to establish serious velocity differences. The working gases having such asymmetrical velocity distribution will establish disturbances such as vortexes when they flow into the mixing chamber located downstream of the electrode c. These disturbances are not damped but released as they are to the outside because they are abruptly accelerated to the exit of the nozzle a having the gradually reduced effect area.

As a result, the velocity distribution remains asymmetrical with respect to the center line of the nozzle a even at the throat f of the nozzle a so that the directivity of the arc jet discharged to the atmosphere is deteriorated to induce a deflection of the arc jet.

In order to examine these phenomena experimentally, we have observed the behavior of the arc jet g to be discharged from the nozzle a, by grinding out a portion of the tip of the electrode holder b of the commercially available air plasma arc torch of 50 A grade to enlarge the difference in the working gas velocity which is established by the working gas passage e in the gap between the nozzle a and the electrode holder b.

These experiments have been performed for several electrode holders and have confirmed that the direction of deflection of the arc jet g and the direction of the ground-out portion of the electrode holder b are aligned.

This means that the asymmetry, if any, of the gap to be formed between the nozzle a and the electrode holder b due to the offset of the axes will induce the deflection of the arc jet g thereby to cause an inclination of an angle $\theta$ at the cut face.

The aforementioned inclination of the cut face grows a serious problem in case the thickness of the plate to be cut is enlarged. In the case of cutting a thick plate, a secondary working may be required, or still the worse the cut work cannot be used as the product, if the angle of inclination of the cut face exceeds some extent.

In order to prevent occurrence of the aforementioned inclination of the cut face, it has been endeavored to raise the working accuracy of a component such as the arc body, the electrode holder or the nozzle. Despite of this endeavor, however, a complete solution has not been obtained yet due to the practical limits in the working accuracy and the assembling accuracy.

SUMMARY OF THE INVENTION

The present invention has been conceived in view of the background thus far described and has an object to provide a transferred plasma arc torch capable of obtaining an excellent cut face having a small angle of inclination even in the case of cutting a thick plate.

In order to achieve the above-specified object, according to a first mode of the present invention, there is provided a transferred plasma arc torch of the type, in which the tip of an electrode holder holding an electrode fixedly is enclosed by a nozzle forming a tapered working gas passage together with said electrode holder, characterized: in that said nozzle has such a chamber inside of a throat formed in the tip of said nozzle as faces said electrode; and in that the following relations are satisfied if the throat diameter of said nozzle is designated at d and if the diameter and axial length of said chamber are designated at D and H, respectively:

$$1.5 \leqq D/d \leqq 10;$$

and $$0.75 \leqq H/D \leqq 5.$$

According to a second mode of the present invention, moreover, there is provided a transferred plasma arc torch comprising a swirler disposed upstream of the working gas passage inside of said nozzle for generating a swirling flow.

According to the transferred plasma arc torch of the aforementioned individual modes of the present invention, the working gases flow in the form of the swirling flow into the working gas passage and are accelerated downstream in the nozzle until they are discharged from the throat of the nozzle, Even if, at this time, the aforementioned working gas flow is disturbed due to the displacement of the axes of the electrode holder and the nozzle, it is damped by the viscosity of the working gases, while it passes through the chamber disposed in the nozzle to face the electrode, until it is released with an even velocity distribution at the nozzle throat.

Thus, it is possible to obtain an excellent cut product having a cut face of small angle of inclination.

The aforementioned and other objects, modes and advantages of the present invention will become apparent to those skilled in the relevant art, from the following description to be made in connection with preferred embodiments of the present invention with reference to the accompanying drawings.

DETAILED DESCRIPTION OF THE PREFERRED EMBODIMENTS

Several specific embodiments of the present invention will be described with reference to FIGS. 3 to 9B.

Figure 8:
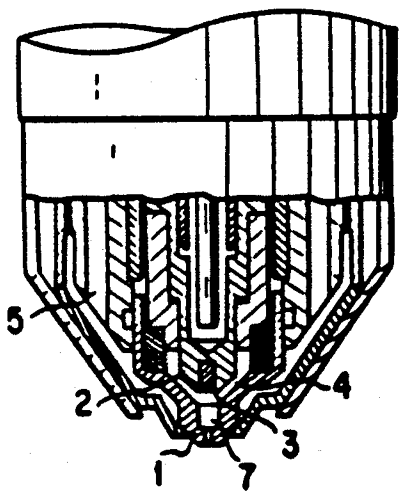
FIG. 8 is a section showing the tip of a transferred plasma arc torch as one specific embodiment of the present invention.

FIG. 8 shows the overall structure of the transferred plasma arc torch according to the present invention. Designated at reference numeral 2 is a cylindrical electrode holder which holds an electrode 3 fixedly at the axial portion of its tip. Moreover, this tip of the electrode holder 2 is enclosed at a gap by a nozzle 1 to form this gap at the inside of the nozzle 1 into a tapered working gas passage 4. On the other hand, the inside of the aforementioned electrode holder 2 and the outside of the nozzle 1 are made to communicate with each other through a cooling water passage 5.

Figure 1:
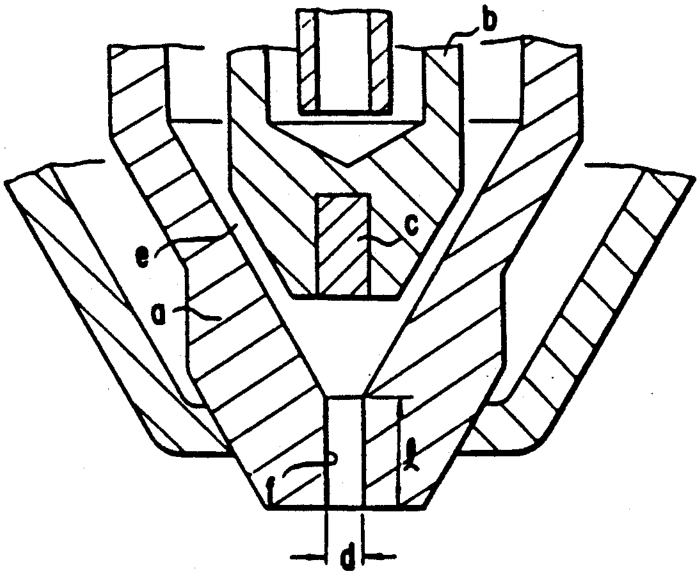
FIG. 1 is a section showing an essential portion of the example of the prior art.
Figure 2:
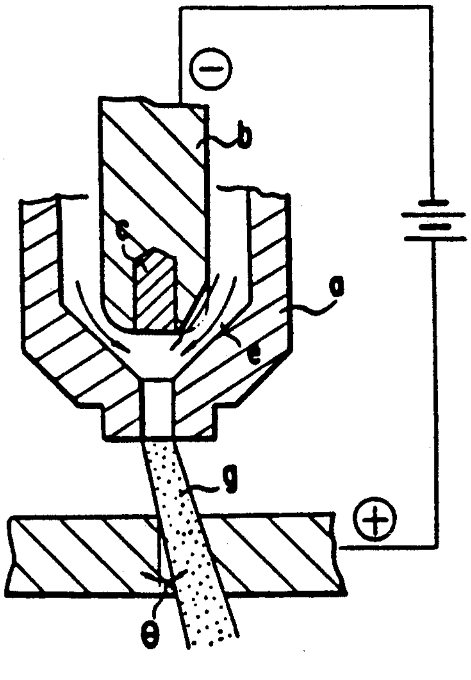
FIG. 2 is an explanatory view for explaining the used state in case the tip of the electrode holder of the example of the prior art is partially removed.
Figure 3:
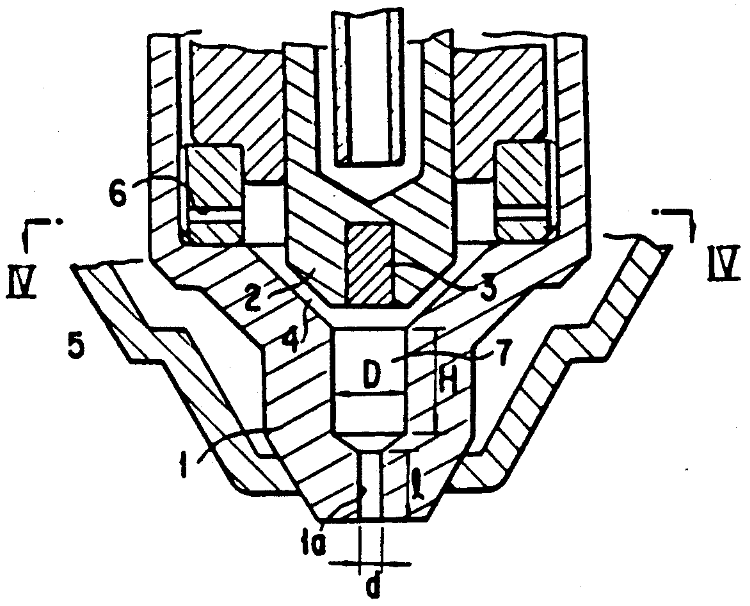
FIG. 3 is a section showing an essential portion of a specific embodiment of the present invention.
Figure 4:
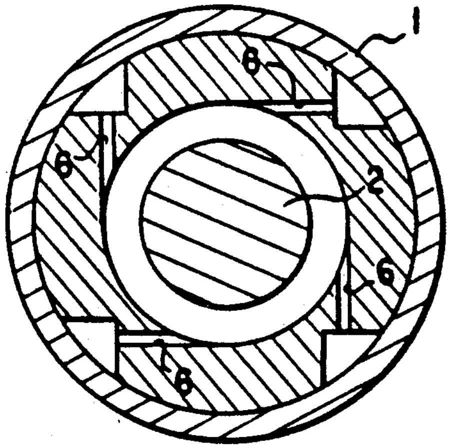
FIG. 4 is a section taken along line II—II of FIG. 3.

In the essential portion of the aforementioned transferred plasma arc torch, as shown in FIGS. 3 and 4, there is disposed in the working gas passage 4 outside of the electrode holder 2 a swirler 6 for swirling the working gases generally tangentially up to the tip of the electrode holder 2.

The nozzle 1 has its tip formed with a throat 1*a* having a diameter d and a length 1. Inside of this throat 1*a*, there is formed a generally cylindrical chamber 7 which has an internal diameter D and an axial length H and which is positioned to face the electrode 3. The internal diameter D of the space 7 is several times as large as the diameter d of the throat 1*a*.

With the structure thus far described, the working gases flowing into the nozzle 1 are swirled by the swirler 6 so that the swirling flow moves downstream of the nozzle 1. In this case, the working gases have only the swirling velocity component at first, but their velocity is accelerated the more as the effective area of the passage becomes the smaller, until it takes the maximum at the position facing the electrode 3. After this, the working gases pass through the chamber 7 of the nozzle 1 until they are discharged from the throat 1*a*.

In this instance, the axial velocity component of the working gases passing through the chamber 7 is maintained at a small level over the distance H of the chamber 7 and is then accelerated to the sonic level at the throat 1*a*. Since, in the chamber 7, the swirling velocity component is retained at the high level, there arises no problem in holding the arc stably.

In the aforementioned operations, the working gases are subjected to a velocity difference while they are passing through their passage 4 or the gap between the nozzle 1 and the electrode holder 3, in case the center lines of the two members 1 and 3 are finely offset. As a result, disturbances are established in the space downstream of the lower end face of the electrode due to the asymmetrical velocity distributions relative to the center line of the nozzle.

However, those disturbances of the working gases are damped by the viscosity of the fluid because of the low velocity of the gases, while they are moving downstream at the low axial velocity component within the chamber 7, until the working gases restore the velocity distribution, which is generally symmetric with respect to the nozzle center axis, in the vicinity of the entrance of the throat 1*a*.

In order to exhibit the aforementioned damping effect of the disturbances due to the viscosity, it is necessary to reduce the axial velocity component of the working gases to a sufficiently small level and to retain a sufficient axial length H of the chamber 7 for damping the aforementioned disturbances completely.

It is, therefore, important to select the aforementioned sizes D and H properly.

According to our examinations, it has been found that the effects of the present invention can be prominently exhibited under a wide variety of running conditions if the sizes D and H are determined to satisfy the following relations for the diameter d of the throat 1*a*:

$$1.5 \leq D/d \leq 10;$$

and $$0.75 \leq H/D \leq 5.$$

Figure 5:
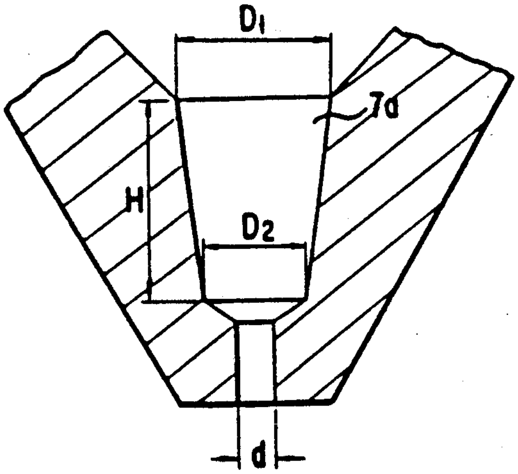
FIGS. 5, 6 and 7 are sections showing essential portions of other specific embodiments of the present invention, respectively.
Figure 6:
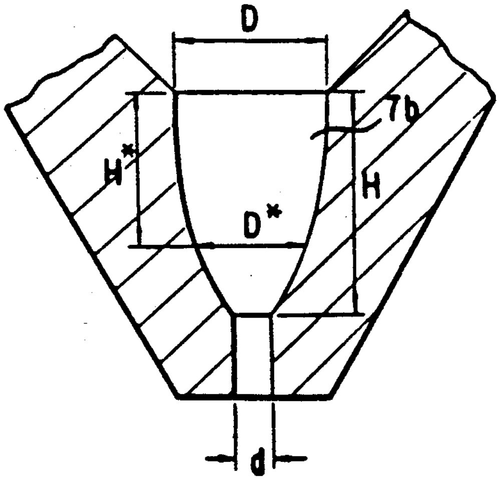
Figure 7:
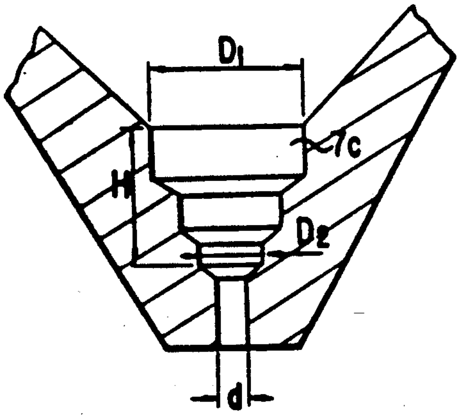

FIGS. 5 to 7 show the individual essential portions of other specific embodiments of the present invention, respectively. In the embodiment shown in FIG. 5, a chamber 7*a* has a shape of a frustum of cone, as expressed by $D_1 > D_2$. In this embodiment, too, the prominent effects can be attained if the following relations are satisfied:

$$1.5 \leq D_2/d \leq 10;$$

and $$0.75 \leq H/D_2 \leq 5.$$

In the embodiment shown in FIG. 6, on the other hand, a chamber 7*b* has a warhead shape having an outer circumference formed of a smooth curve. In this embodiment, too, the prominent effects can be attained if the following relations are satisfied:

$$1.5 \leq D^*/d \leq 10;$$

and $$0.75 \leq H^*/D^* \leq 5.$$

In the embodiment shown in FIG. 7, moreover, a chamber 7*c* is formed to have a multiplicity of steps of cylinders having their diameters reduced gradually to the outside. In this embodiment, too, the prominent effects can be attained if the following relations are satisfied:

$$1.5 \leq D_2/d \leq 10;$$

and $$0.75 \leq H/D_1 \leq 5.$$

Here will be presented the results of comparing the example of the prior art and the specific embodiment of the present invention, as shown in FIG. 3, by comparing their operational effects:

Example of the Prior Art:

d=0.4 mm, and 1=1,4 mm;

Embodiment of the Invention:

d=0.4 mm, 1=1.4 mm,

D=2 mm, and H=3 mm; and

Operation Current - - - 12 A,

Plasma Gases - - - Oxygen Gases,

Working Gas Pressure - - - 5.5 Kg/cm$^2$, Plate to Be Cut - - - SPC, and Plate Thickness - - - 1.6 mm.

Figure 9A:
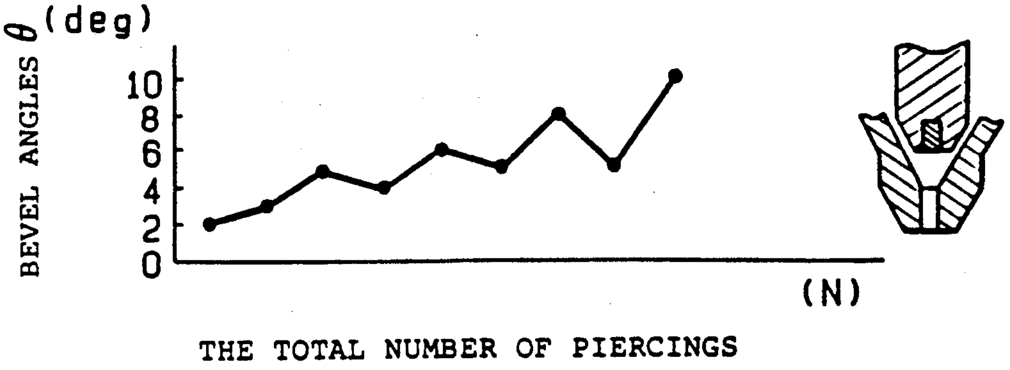
FIGS. 9A and 9B are diagrams showing and comparing the agings of the bevel angles of the example of the prior art and the specific embodiment of the present invention, respectively.
Figure 9B:
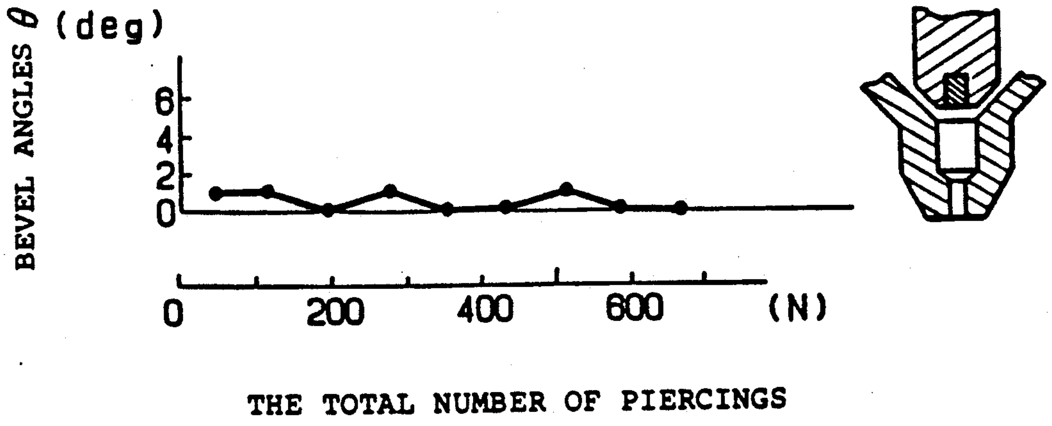

The bevel angles $\theta$ (i.e., the angles of inclination) of the above-specified two examples are plotted in FIGS. 9A and 9B. It could be found that the cutting quality of the embodiment of the present invention, as shown in FIG. 9B, is better to have a smaller inclination of cut face than that of the example of the prior art, as shown in FIG. 9A, even after a long use. Moreover, another accompanying phenomenon is that the quality of the dross to be attached to the lower end of the cut face is drastically reduced.

Incidentally, the measurements of the aforementioned angles $\theta$ of inclination of the cut face were periodically repeated after a predetermined number of piercing.

I claim:

1. A transferred plasma arc torch of the type, in which a tip of an electrode holder holding an electrode is enclosed by a nozzel forming a tapered working gas passage together with said electrode holder, characterized: in that said nozzel defines a chamber of circular cross section following said tapered working gas passage, said chamber having one end facing said electrode and another end terminating in a cylindrical throat; and in that the following relations are satisfied if the throat diameter of said nozzel is designated at d and if the diameter and axial length of said chamber are designated at D and H, respectively:

$$1.5 \leqq D/d \leqq 10;$$

and $$0.75 \leqq H/D \leqq 5.$$

2. A transferred plasma arc torch as set forth in claim 1, comprising a swirler disposed upstream of the working gas passage inside of said nozzel for generating a swirling flow.

3. A transferred plasma arc torch as set forth in claim 1, characterized in that said chamber has a generally cylindrical shape.

4. A transferred plasma arc torch as set forth in claim 1, characterized in that said chamber generally has a shape of fustum of cone.

5. A transferred plasma arc torch as set forth in claim 1, characterized in that said chamber has a shape having an outer circumference formed of a smooth curve, said chamber having a diameter D at said end facing said electrode and a diameter d at said end terminating in said throat.

6. A transferred plasma arc torch as set forth in claim 1, characterized in that said chamber has a shape of a multiplicity of cylindrical stages having their diameters reduced gradually toward said throat

* * * * *

UNITED STATES PATENT AND TRADEMARK OFFICE
CERTIFICATE OF CORRECTION

PATENT NO. : 5,214,263

DATED : May 25, 1993

INVENTOR(S) : Shun-ichi Sakuragi

It is certified that error appears in the above—identified patent and that said Letters Patent is hereby corrected as shown below:

In column 5, claim 1, line 34, and column 6, claim 1, delete "package" and insert --passage--

In column 6, claim 4, line 23, delete "fustum" and insert --frustum--

In column 6, claim 6, line 33, insert "." after --throat"

Signed and Sealed this

Twenty-fifth Day of January, 1994

*Attest:*

Bruce Lehman

BRUCE LEHMAN

*Attesting Officer* *Commissioner of Patents and Trademarks*